United States Patent [19]

Mikame

[11] Patent Number: 4,774,602
[45] Date of Patent: Sep. 27, 1988

[54] METHOD FOR DISTINGUISHING ORIGINAL OF A MAGNETICALLY RECORDED MEDIUM FROM ITS DUPLICATES

[75] Inventor: Yoshio Mikame, Saku, Japan
[73] Assignee: TDK Corporation, Tokyo, Japan
[21] Appl. No.: 83,005
[22] Filed: Aug. 6, 1987

Related U.S. Application Data

[63] Continuation of Ser. No. 795,402, Nov. 6, 1985, abandoned.

[30] Foreign Application Priority Data

Dec. 19, 1984 [JP] Japan ................................ 59-267882

[51] Int. Cl.$^4$ ............................................. G11B 15/04
[52] U.S. Cl. ..................................................... 360/60
[58] Field of Search ........................................... 360/60

[56] References Cited

FOREIGN PATENT DOCUMENTS 2112971 7/1983 United Kingdom ................. 360/60

*Primary Examiner*—Vincent P. Canney
*Attorney, Agent, or Firm*—Oblon, Fisher, Spivak, McClelland & Maier

[57] ABSTRACT

In order to distinguish the original of a magnetically recorded medium such as floppy disc from its duplicates, the present invention proposes that the ID field part and the data field part are recorded successively in the floppy disc to be the original, and then both these ID field part and the data field part are read out successively at the time of its reproduction, thereby detecting a phase difference at the splice point of the data field part, thus being able to determine whether the floppy disc is original, or not.

3 Claims, 1 Drawing Sheet

METHOD FOR DISTINGUISHING ORIGINAL OF A MAGNETICALLY RECORDED MEDIUM FROM ITS DUPLICATES

This application is a continuation of application Ser. No. 795,402, filed on Nov. 6, 1985, now abandoned.

The present invention relates to a method for distinguishing the original of a magnetically recorded medium from its duplicated copies. More particularly, it is concerned with a method for discriminating the original of a magnetically recorded medium from its duplicates, by which it is possible to make judgement as to whether a magnetic flexible disc cartridge recorded with data is the original or a copy thereof.

In recent years, as the consequence of diffusion of personal computers, word processors, etc. in our society, various softwares are recorded in magnetic recording media and such magnetically recorded media have been circulated among users.

As is well known, there are various sorts of the magnetic recording medium such as, for example, magnetic drum, magnetic tape, magnetic flexible disc cartridge, and so forth. Of these, the magnetic flexible disc cartridge (which will hereinafter be called "floppy disc") possesses various advantages such that it is easy to handle, has a quick data transfer speed, is available at a low cost, etc. Thus, in the following, brief explanations will be given as to the method of recording data in the floppy disc in reference to the accompanying drawing.

DESCRIPTION OF THE PREFERRED EMBODIMENTS

Figure 1:
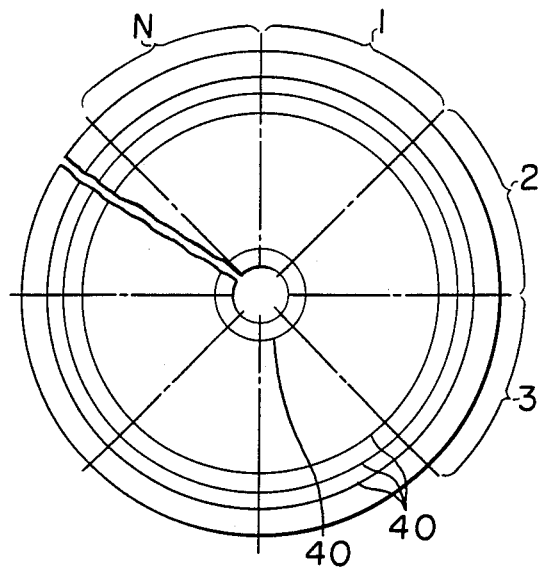
FIG. 1 is a schematic diagram showing the recorded surface of the floppy disc. In the drawing, a plurality of tracks are concentrically formed on the recorded surface of the floppy disc. Each of these tracks 40 is divided into a plurality of sectors (1 to N) as illustrated.
Figure 2:
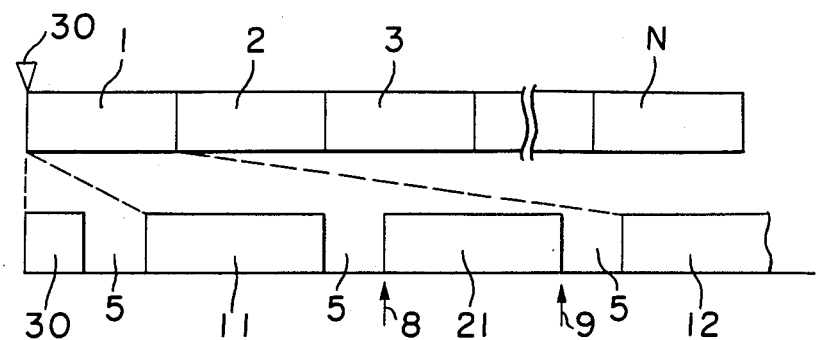
FIG. 2 is a schematic diagram showing one example of format of one track shown in FIG. 1. In the drawing, those parts which are identical with those in FIG. 1 are designated by the same reference numerals.

In FIG. 2, the starting point of the track is indicated by an index 30. Each of the sectors on the track is composed of an ID field part, a data field part, and gaps. For instance, the sector 1 includes the ID field part 11, the gap 5, the data field part 21, and the gap 5 between the data field part 21 and the ID field part 12 of the next sector 2.

An LSI (such as, for example, μPD765A, a product of Nippon Electric Co. Ltd.; MB8876, a product of Fujitsu Ltd.; and others) for a floppy disc controller (FDC) to be used for general personal computers, etc. first records the ID field part alone in each sector of the tracks, after which it records the data field part.

As the consequence of this, when the data field part is being recorded, there takes place phase differences between the start point 8 and the end point 9 (i.e., the splice point) in the data field part owing to irregularities in rotation of the floppy disc.

However, in the ordinary reading instructions, since only the information as read out of the data field part are forwarded to the host computer, the information in the data field part can be accurately read out, even if the phase difference takes place in the splice point.

However, the above-described conventional technique possesses the following points of problem, which should be solved.

As mentioned in the foregoing, the floppy disc controller in general is able to accurately read out information in the data field part, even when the phase differences take place between the start point and the end point in the data field part. In addition, if the information can be read out of the floppy disc, it would be possible to record such information into other floppy disc or discs, i.e., duplicate copies of the original can be made.

However, duplication of the software by the users is not so agreeable to those manufactures whose business is to record the software into the floppy discs and put them in the market for sale, because such duplicating work done by the users themselves would suppress or reduce the sales quantity of the floppy discs.

There would further be a risk such that the data field part in the floppy disc (hereinafter referred to simply as "original"), in which the softwares have been recorded and which are to be sold by the manufacturers, could possibly be altered by the users. When such original with its contents having been altered will be lent out or borrowed irrespective of the intention between the lenders and the borrowers, i.e. regardless of between them, it is apprehended that the goodwill in business of the manufactures might be considerably impaired.

The present invention has been made with a view to solving such points of problem as mentioned in the foregoing.

For solving the above-described problems, the present invention takes measures such that the ID field part and the data field part are successively recorded in the floppy disc to be the original, and both these ID field part and data field part are successively read out at the time of reproduction to thereby detect a phase difference at the splice point of the data field part, whereby it provides the caracteristic function and effect of being able to determine whether the floppy disc in question is the original, or not.

In the following, the present invention will be described in detail.

The present invention makes it the premises that the writing of information into the ID field part and the data field part of the floppy disc to be the original is carried out in succession for each and every sector. This information writing can be done by use of, for example, ADC-475 type initializer.

When the data are successively read into the ID field part and the data field part, there occurs no phase difference, as a matter of course, between the start point and the end point of the data field part.

When users are producing duplicates from the thus obtained original of the floppy disc, or when they are altering the original, as the rotational speed of the floppy disc at the time of such alteration or duplication differs somewhat from the rotational speed of the floppy disc at the time of producing the original, there takes place a phase differences between the start point and the end point of the data field part of the duplicated floppy disc. Such phase difference may also take place by irregular rotation of the floppy disc.

As already mentioned above, with the reading instructions to the ordinary floppy disc, it is not possible to detect presence of the phase difference at the splice point.

However, with the "read diagnostic" instructions or the "read track" instructions, it is possible to read successively all the information in the gap part, the ID field part, and the data field part which follows the data field part in a sector immediately after the index signal. Therefore, if a phase difference exists between the data field part and the gap part, the phase difference can be detected.

That is to say, since a bit difference occurs in the data as read out, following the splice point and thereafter, owing to the phase difference at the splice point between the start point and the end point in the abovementioned data field part, if the detection is carried out as to whether the bit difference has occurred at the time of reading the data, or not, judgement can be made as to whether the floppy disc in question is the original or a duplicate therefrom, or whether the contents of the data of the original have been altered, or not.

Further, irrespective of whether the floppy disc is the duplicate made from the original, or it contains the data which have been altered from the original, the probability of non-occurrence of the phase difference between the start point and the end point in the data field part will be ½ per sector, since the data are usually written in the "bit-serial" mode, and 1 byte contains 8 bits.

Accordingly, when the abovementioned phase difference is checked on one sector alone, the probability of the floppy disc, which has been duplicated from the original, or the contents of the data of which have been altered, being mistaken for its original is ⅛.

Moreover, as the number of the sectors to be checked increases, the probability of the non-occurrence of the phase difference lowers correspondingly such that it is 1/64 on two sectors, 1/512 on three sectors, and so on, with the consequence that the determination of whether the floppy disc in question is the original or not can be done with high accuracy.

In this way, once it becomes possible to determine whether the floppy disc in question is the original or a duplicate from the original, or whether the contents of the original data therein have been altered, or not, such corrupt floppy disc can be made unusable any longer, even if such duplication or alteration will have been done by those other than the manufactures.

In more detail, when the program for the floppy disc controller is so prepared that, upon detection of the phase difference, the information in the data field part of the floppy disc may not be read out, in other words, the application program may not work, the use of the floppy disc can be made impossible, whereby the duplication and/or alteration of the floppy disc can be substantially prohibited.

As it will be apparent from the foregoing description, the present invention is capable of providing the following effects.

(1) When the information data are recorded successively into the ID field part and the data field part of the original floppy disc, and the information as stored in the floppy disc are read out with the "read diagnostic" instructions, the existence of the phase difference between the start point and the end point in the data field part can be detected, whereby it becomes possible to determine as to whether the floppy disc in question is the original or a duplicate made from the original, or whether the data field part has been altered, or not.

(2) When the program for the floppy disc controller is so prepared that, upon detection of the phase difference between the start point and the end point in the data field part, the information in the data field part of the floppy disc in question may not be read out, use of the floppy disc other than its original can be made impossible, whereby the duplication of the floppy disc as a whole and the alteration of the data field part can be substantially prevented.

(3) Since the information in the data field part of the duplicated floppy disc cannot be read out, no further duplication can be effected from the duplicated floppy disc with the consequence that circulation of the duplicated products in the market can be prevented.

What is claimed is:

1. A method for distinguishing the original of a magnetically recorded medium from a duplicate, comprising the steps of;
    recording, in succession on said medium an ID field part and a data field part wherein the end point of said data field part constitutes a splice point;
    reading out said ID field part and said data field part successively in order to detect a phase difference at said splice point in said data field part;
    determining whether said magnetically recorded medium is said original or one of said duplicates based on said phase difference at said splice point.

2. An apparatus for reading out information as recorded in a magnetic recording medium wherein said information has a ID field part and a data field part, comprising:
    means for reading said recorded information;
    detection means for detecting, at the time of the operation of said reading means, a phase difference at the gap portion between said ID field part and said data field part;
    means for stopping said reading when said phase difference is detected.

3. A magnetic recording medium comprising:
    means for recording information in the format of a ID field part and a data field part;
    means for reading out said information and outputting a readout signal;
    means for detecting a phase difference at a gap part between said ID field part and said data field part wherein said detecting means outputs a signal to inhibit the outputting of said readout signal.

* * * * *